US008823484B2

(12) United States Patent
Kennedy et al.

(10) Patent No.: US 8,823,484 B2
(45) Date of Patent: Sep. 2, 2014

(54) SYSTEMS AND METHODS FOR AUTOMATED ADJUSTMENT OF DEVICE SETTINGS

(75) Inventors: Sean Patrick Kennedy, San Diego, CA (US); Andrew Lee Lawton, San Marcos, CA (US)

(73) Assignee: Sony Corporation, Tokyo (JP)

( * ) Notice: Subject to any disclaimer, the term of this patent is extended or adjusted under 35 U.S.C. 154(b) by 220 days.

(21) Appl. No.: 13/167,346

(22) Filed: Jun. 23, 2011

(65) Prior Publication Data

US 2012/0326834 A1 Dec. 27, 2012

(51) Int. Cl.
| | |
|---|---|
| G05B 23/02 | (2006.01) |
| G09G 3/36 | (2006.01) |
| G09G 5/02 | (2006.01) |
| G09G 3/34 | (2006.01) |
| G09G 3/30 | (2006.01) |
| G09G 5/00 | (2006.01) |
| H04N 21/45 | (2011.01) |
| H04N 21/4223 | (2011.01) |
| H04N 21/442 | (2011.01) |
| H04M 1/725 | (2006.01) |
| H04N 21/431 | (2011.01) |
| H04N 21/422 | (2011.01) |
| H04N 21/414 | (2011.01) |
| H04N 5/58 | (2006.01) |
| H04N 21/462 | (2011.01) |
| H04N 21/485 | (2011.01) |

(52) U.S. Cl.
CPC ............. *G09G 5/00* (2013.01); *H04N 21/4532* (2013.01); *G09G 2360/144* (2013.01); *H04N 21/4223* (2013.01); *H04N 21/44222* (2013.01); *H04M 2250/12* (2013.01); *H04M 1/72519* (2013.01); *H04N 21/4312* (2013.01); *H04M 2250/52* (2013.01); *H04N 21/42203* (2013.01); *H04N 21/42202* (2013.01); *G09G 2320/06* (2013.01); *H04N 21/41407* (2013.01); *H04N 5/58* (2013.01); *H04N 21/4622* (2013.01); *H04N 21/485* (2013.01)

USPC ............ 340/3.1; 345/102; 345/690; 345/691; 345/84; 345/77; 455/63.1

(58) Field of Classification Search
CPC ............ G09G 3/34; G09G 2320/0666; G09G 2320/0626; G09G 2360/145
USPC ............... 340/3.1; 345/102, 690, 691, 84, 71; 455/63.1

See application file for complete search history.

(56) References Cited

U.S. PATENT DOCUMENTS 6,870,529 B1 * 3/2005 Davis ............................ 345/207
7,236,154 B1 * 6/2007 Kerr et al. ..................... 345/102

(Continued)

FOREIGN PATENT DOCUMENTS

WO   WO 2007/042301   4/2007

OTHER PUBLICATIONS

"Windows 8 Themes Will Change Aero Theme Color Based on Wallpaper," [online] http://windows7themes.net/windows-8-themes-will-change-aero-theme-color-based-on-wallpaper.html, Apr. 11, 2011, retrieved from the internet Jul. 21, 2011.

*Primary Examiner* — George Bugg
*Assistant Examiner* — Munear Akki
(74) *Attorney, Agent, or Firm* — Moser Taboada

(57) ABSTRACT

System and methods for automated adjustment of device settings are described. An electronic device comprises a receiver for receiving environmental information related to a surroundings of the device, a setting configurator for determining a desired setting for the device as a function of the environmental information, and a setting adjuster for adjusting a device setting in accordance with the desired setting. Moreover, the device further comprises a sensor for receiving the stimulus from the surroundings, for determining the value of the stimulus, and for sending the value of the stimulus to the receiver. Further, the device setting includes a volume of a speaker or a headphone, a theme or a color of a background displayed by the display, a brightness of the display, a sharpness of the display, a user interface displayed on the display, an intensity of a backlight of the display, or a contrast of the display.

18 Claims, 6 Drawing Sheets

(56) References Cited

U.S. PATENT DOCUMENTS

| | | | |
|---|---|---|---|
| 7,646,392 | B2 | 1/2010 | Klassen et al. |
| 7,868,905 | B2 | 1/2011 | Kerr |
| 2002/0094869 | A1* | 7/2002 | Harkham .................... 463/42 |
| 2002/0167536 | A1* | 11/2002 | Valdes et al. ............... 345/633 |
| 2006/0066629 | A1 | 3/2006 | Norlander et al. |
| 2006/0077214 | A1* | 4/2006 | Tsou et al. .................. 345/690 |
| 2006/0256037 | A1 | 11/2006 | Kerr |
| 2008/0153537 | A1* | 6/2008 | Khawand et al. .......... 455/550.1 |
| 2009/0055484 | A1* | 2/2009 | Vuong et al. ................ 709/206 |
| 2009/0115718 | A1 | 5/2009 | Qiao et al. |
| 2009/0158168 | A1* | 6/2009 | Heo et al. ................... 715/747 |
| 2011/0076992 | A1* | 3/2011 | Chou et al. ................ 455/414.1 |
| 2011/0207449 | A1* | 8/2011 | Shin et al. ................... 455/419 |
| 2011/0249122 | A1* | 10/2011 | Tricoukes et al. ........... 348/158 |
| 2011/0294525 | A1* | 12/2011 | Jonsson ....................... 455/466 |

\* cited by examiner

SYSTEMS AND METHODS FOR AUTOMATED ADJUSTMENT OF DEVICE SETTINGS

TECHNICAL FIELD

The present disclosure relates to electronic devices, including but not limited to portable electronic devices, and to systems and methods for adjusting the appearance of the electronic devices.

BACKGROUND

Electronic devices, including handheld electronic devices and portable computers, have gained widespread use. With the advances in their technologies, the size and the weight of the electronic devices, and in particular portable devices, have decreased dramatically. Latest models of laptop computers, for example, can easily be carried in a backpack or even in a large purse. At the same time, the number of functionalities performed by the portable devices has increased. In recent years, handheld devices such as smartphones are not only able to perform the common functions of a phone, but can also perform many of the functionalities that were traditionally reserved for other devices such as computers, cameras, or audio players.

Due to the small size, low weight, and versatility of portable devices, users often carry their devices with them all the time, and use those devices in a wide variety of surroundings. However, conventional devices have not been designed to adapt to changes in the surroundings. For example, when a user who is reading a document on the handheld device moves from a dark room to a bright outdoor location, the user often loses the ability to see the information displayed on the screen. Similarly, if a user who is conversing or listening to music on a handheld device walks from a quiet place to a noisy environment, the user will have a hard time hearing the sound of the device and sometimes has to manually readjust the volume level of the device. As another example, when a user is typing on a laptop, if the surroundings get dark, the user may not be able to see the keyboard. Some conventional devices provide a backlight for the keyboard, but the backlight needs to be manually activated by the user. Also, activating the backlight itself often requires seeing the keyboard, which is the problem to begin with. Sometimes, even while the surroundings remain dark, the backlight turns off automatically and requires reactivation.

Moreover, while conventional devices may have many settings, most must be set by a user and therefore remain the same until the user makes a change. During the period of use, however, users will go through a wide variety of personal moods and the same settings may not have equal appeal to the user at different times and types of use. For example, a user may be happy while exchanging emails or chatting with a friend and may later become sad or upset after reading some unpleasant news. The device's display background, outer appearance (such as color or lighting), and other settings nevertheless remain static throughout these mood changes, without manual intervention by the user.

Further, conventional devices lack the ability to adjust the appearance of foreground objects on the display based on other changes made on the device. For example, when a user changes the background of the device display by choosing one of the pre-set backgrounds or by choosing another background, such as a new photo, the colors and lightings in various areas of the display change but the objects in the foreground, e.g., the icons, control buttons, or application windows, are often shown in specific previously-set styles, colors, or brightness which may not match the background aesthetically or provide good contrast with the background. Therefore, the combination of the new background and the foreground objects may make the foreground objects difficult to see or may create an unpleasant aesthetic experience for the user.

SUMMARY

Methods and systems disclosed herein allow electronic devices to adapt their settings to changes in their surroundings. In various embodiments, the adjustments are made based on external stimuli received from the surroundings, e.g., lighting, sound, or temperature. Also, in some embodiments, the adjustments may be made based on inputs from the user or on the user's activity, e.g., a user-selected theme, a user-selected mood, or a determined mood derived from the user's input or activity. For example, input devices may capture the user's voice or typed text. Similarly, a motion detector may be used to capture movement or activity of the user. The captured information may be used to determine the mood of the user.

In various embodiments, the device adapts one or more of the device settings, e.g., the appearance of the objects on the display, the volume of the speaker or the headphone, or the appearance, temperature, or texture of different parts of the device housing based on the conditions in the device surroundings, the user's mood, or a user-selected theme.

Further, methods and systems described herein allow electronic devices to adjust the appearance of the foreground objects on the display to the background of the display without manual intervention by a user. In certain embodiments, adjustments may automatically be made to the color or the brightness of the foreground objects to create a better contrast or a better aesthetic match with the background. In some embodiments, the adjustments may depend on a global property of the background or on a local property of the background at the location of the foreground object.

According to some embodiments, an electronic device comprises a sensor for receiving a stimulus from the surroundings; a receiver for receiving environmental information related to a surroundings of the device from the sensor, wherein the environmental information includes a value of the stimulus from the surroundings; a setting configurator for determining a desired setting for the device based on the environmental information; and a setting adjuster for adjusting a device setting in accordance with the desired setting.

In some embodiments, the receiver includes a network receiver for receiving the environmental information from a remote server. Further, in some embodiments, the electronic device further comprises a transmitter for transmitting, to the remote server, location information related to a location of the device.

In various embodiments, the sensor is a camera, a microphone, a heat sensor, a humidity sensor, a light sensor, or a motion detector. Moreover, in some embodiments, the device setting includes a volume of a speaker, a volume of a headphone, a theme of a background displayed by a display, a color of the background displayed by the display, a brightness of the display, a sharpness of the display, a user interface displayed on the display, an intensity of a backlight of the display, or a contrast of the display.

Further, in some embodiments, the device includes a part, and the device setting includes a color of the part, a luminosity of the part, a temperature of the part, or a texture of the part. In some embodiments, the part is a housing of the device, a section of the housing of the device, an input unit of the device, or a logo displayed on the device.

Moreover, in some embodiments, the receiver is further configured for receiving input information related to an input of a user of the device and the setting configurator is further configured for determining the desired setting as a function of the environmental information and the input information. Further, in some embodiments, the input information includes a selection of an image by the user, a typing of a text by the user, or a selection of a mood by the user.

In various embodiments, the electronic device further includes a portable computer, a desktop computer, a handheld device, a smart camera, a smart phone, or a remote control device.

Moreover, in accordance with some embodiments, a method is performed by an electronic device for adjusting an appearance of the electronic device. The method comprises receiving, by a sensor of the electronic device, a stimulus from the surroundings; receiving, by the receiver, environmental information related to a surroundings of the device, wherein the environmental information includes a value of the stimulus from the surroundings; determining, by a setting configurator, a desired setting for the device as a function of the environmental information; and adjusting, by a setting adjuster, a device setting in accordance with the desired setting.

Further, in some embodiments, receiving the environmental information comprises receiving the environmental information from a remote server. Moreover, in some embodiments, the method further comprises transmitting to the remote server, via a transmitter, location information related to a location of the device.

Yet, in some embodiments, the stimulus includes light, sound, luminosity, color, temperature, humidity, or gravity. Moreover, in various embodiments, the device setting includes a volume of a speaker, a volume of a headphone, a theme of a background displayed by a display, a color of the background displayed by the display, a brightness of the display, a sharpness of the display, a user interface displayed on the display, an intensity of a backlight of the display, or a contrast of the display.

Moreover, in some embodiments, the method further comprises receiving input information related to an input of a user of the device and the determining includes determining the desired setting as a function of the environmental information and the input information. Further, in some embodiments, the input information includes a selection of an image by the user, a typing of a text by the user, or a selection of a mood by the user.

Moreover, according to some embodiments, a non-transitory computer-readable medium includes computer-readable code executable by the electronic device to perform the above methods.

BRIEF DESCRIPTION OF THE DRAWINGS

The drawings are not necessarily to scale. Instead, emphasis is generally placed upon illustrating the principles of the inventions described herein. It is to be understood that the following detailed description is exemplary and explanatory only and is not restrictive of any invention, as claimed. The accompanying drawings, which are incorporated in and constitute a part of this specification, illustrate several embodiments of the inventions and together with the description, serve to explain the principles of the inventions. In the drawings:

DETAILED DESCRIPTION

Figure 1:
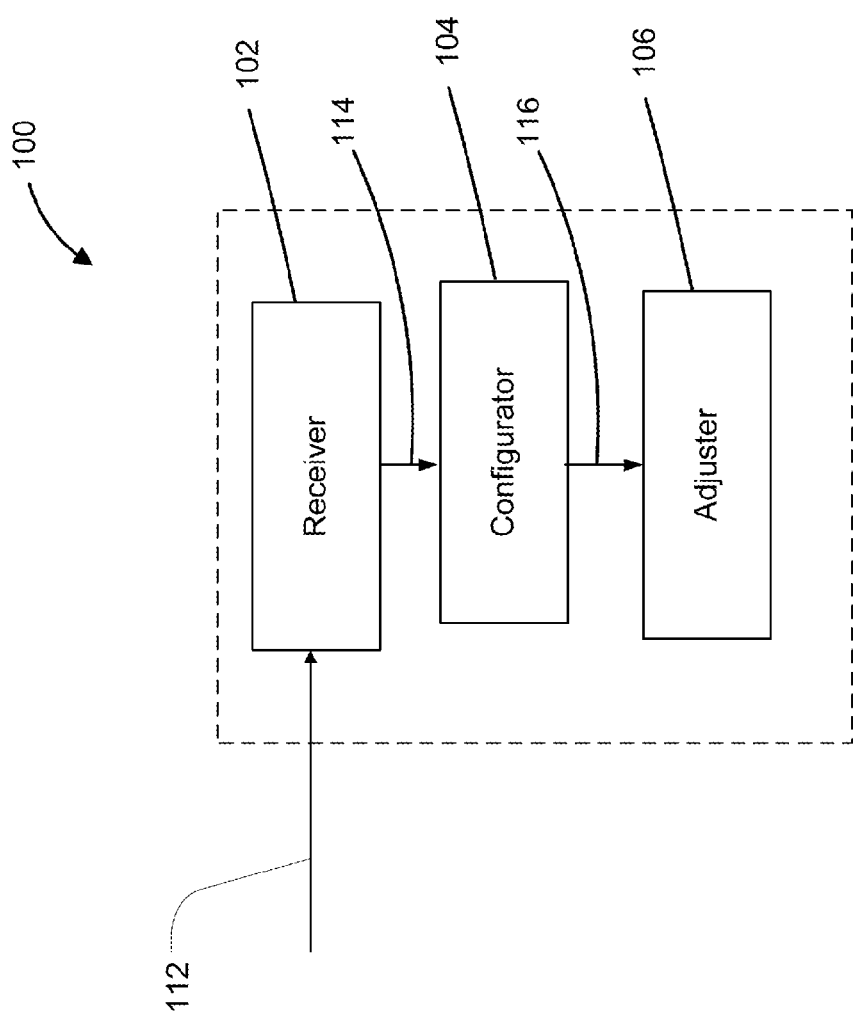
FIGS. 1 and 2 are block diagrams of exemplary devices in accordance with various embodiments.

For simplicity and clarity of illustration, reference numerals may be repeated among the figures to indicate corresponding or analogous elements. Also, similarly-named elements perform similar functions and are similarly designed, unless specified otherwise. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In various embodiments described herein, electronic devices may adjust their settings according to environmental information related to the surroundings of the device. FIG. 1 is a block diagram of such an exemplary device 100. As shown in FIG. 1, device 100 may comprise a receiver 102, a configurator 104, and an adjuster 106, which are operatively connected by either wired or wireless connection, directly or indirectly to one another. In accordance with various embodiments, device 100 may be, for example, a portable computer, a desktop computer, or a handheld device such as a smart phone, a smart camera, or a remote control device.

Receiver 102 is for receiving environmental information 112 related to the surroundings of device 100 and for generating configurator information 114. In some embodiments, receiver 102 may be a processor executing receiver software modules. In some embodiments, receiver 102 may be a dedicated hardware module executing firmware software. In some embodiments, receiver 102 may receive environmental information 112 from sensors that are internal to device 100. Receiver 102 may also include a network receiver, such as a wired or a wireless network card, and execute the corresponding software, for receiving environmental information 112 from a network. In embodiments described herein, environmental information 112 may be, for example, some information relating to the environment surrounding the device, such as but not limited to, light intensity or type, sound levels or type, smells, or weather parameters such as temperature or humidity.

Receiver 102 transmits configurator information 114 to configurator 104. Configurator information 114 may be some or all of environmental information 112. In some embodiments, receiver 102 may generate configurator information 114 from environmental information 112 by, for example, determining what type of information configurator 104 can use, and forwarding only that portion of the received environmental information 112 to configurator 104. For example, in cases where device 100 is capable of adjusting its display lighting but not its volume, receiver 102 may extract only information related to the luminosity of the surroundings from environmental information 112, but not information related to the surrounding sounds. Similarly, in embodiments in which device 100 is a camera capable of adjusting its recordings to the camera's motion, such as sudden jolts, receiver 102 may extract only information related to the motion of the camera from environmental information 112.

In some embodiments, receiver 102 may transmit configurator information 114 in a format that is suitable for configurator 104. For example, if environmental information 112 includes analog information and configurator 104 only accepts digital information, receiver 102 may include an analog to digital convertor for transforming the analog environmental information into the digital format usable by configurator 104. However, in some embodiments, receiver 102 may transmit some or all of environmental information 112 directly to configurator 104 without any changes. Also, in some embodiments, configurator 104 may performs its own processing, extraction, or reformatting of the information it receives from receiver 102.

Configurator 104 is for receiving configurator information 114 and for accordingly configuring device 100 by determining desired settings 116. In various embodiments, configurator 104 may be a hardware module or a software module, or a combination thereof, configured to determine desired settings 116 for device 100. For example, configurator 104 may comprise a processor executing configurator software modules. In some embodiments, configurator 104 may be a dedicated hardware module, or a dedicated hardware executing firmware. Desired settings 116 may be parameters for adjusting device 100 based on the configurator information 114. For example, if the configurator information indicates a high luminosity level in the surroundings, desired settings 116 may include a parameter that causes the display of device 100 to have high contrast or an intense back lighting. Similarly, in some embodiments, if the configurator information indicates a high average volume for surrounding noises, desired settings 116 may include a parameter to increase volume for the speaker or the headphone of device 100.

Adjuster 106 is for receiving desired settings 116 from configurator 104 and accordingly adjusting settings of device 100. For example, if desired settings 116 includes a parameter to increase volume, adjuster 106 may increase the volume of the speaker or the headphone for device 100. In various embodiments, adjuster 106 may be a processor of device 100 executing adjuster software modules, a dedicated hardware module, or dedicated hardware executing firmware software. In some embodiments, adjuster 106 sends control signals to various controls of device 100, e.g., the display controls, sound controls, or recording controls. In some embodiments, configurator 104 and adjuster 106 are included together in a hardware module which adjusts the settings of device 100 in response to environmental information 112 or configurator information 114.

Figure 2:
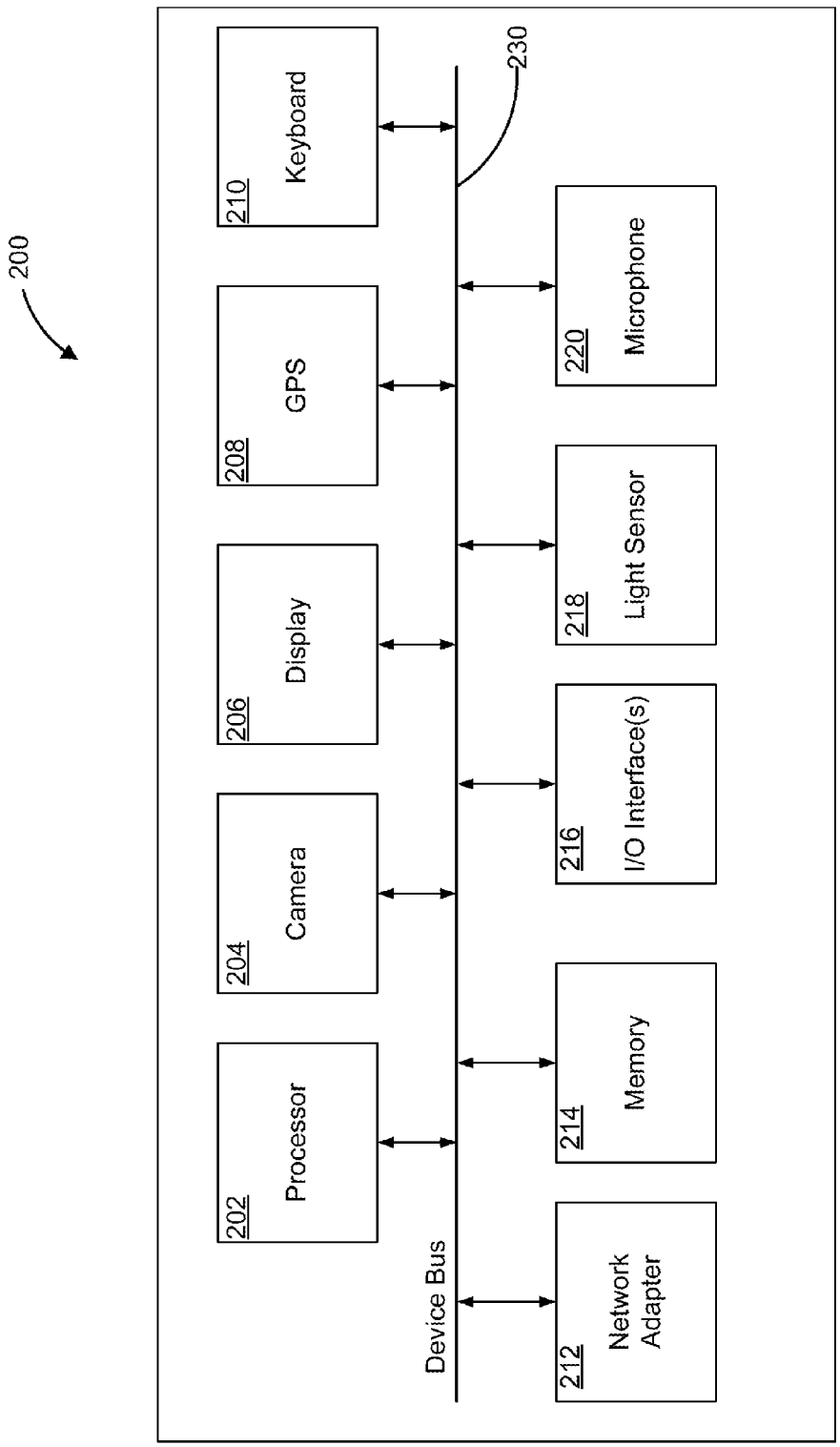

Electronic devices, in accordance with various embodiments, include multiple hardware or software units for adjusting to the surroundings. FIG. 2 is a block diagram of an exemplary device 200 including multiple units in accordance to an embodiment. Device 200 includes a processor 202, a display 206, a memory 214, a keyboard 210, and other I/O interfaces 216, and a network adapter 212. Further, device 200 includes one or more sensors, including a camera 204, a global positioning service (GPS) receiver 208, a light sensor 218, and a microphone 220. These units communicate with each other via bus 230.

In various embodiments, processor 202 can be a microprocessor or a central processor unit (CPU) performing various methods in accordance to the embodiment. Memory 214 can include a computer hard disk, a random access memory (RAM), a removable storage device, or a remote computer storage device. In various embodiments, memory 214 stores environmental information 112, configuration information 114, desired settings 116, or various software programs executed by processor 202. Network adapter 212 enables device 200 to exchange information with external networks. In various embodiments, network adapter 212 includes a wireless wide area network (WWAN) adapter, or a local area network (LAN) adapter. I/O interfaces 216 can include keyboard 210, or a mouse, an audio input device, a touch screen, or an infrared input interface.

In various embodiments, sensors enable device 200 to obtain information about the stimuli in the surroundings. In particular, camera 204 may obtain visual information from the surroundings. Device 200 can use camera 204 to obtain information about the color combination, lighting, light intensity, or the motion of objects in the surroundings. Alternatively, device 200 can obtain information about the visual stimuli in the surroundings via light sensor 218. Device 200 may use GPS receiver 208 to obtain various information including, for example, information about location, or motion of device 200. In some embodiments, device 200 includes a motion detector to detect the motion of device 200. Device 200 uses microphone 220 to obtain information about the sounds in the surroundings, e.g., the level of noise or the music played. In various embodiments, device 200 may include a subset of the above discussed sensors or additional sensors for obtaining other types of information from the surroundings. For example, in some embodiments, device 200 also includes a heat sensor or a humidity sensor for detecting the temperature or the level of humidity in the surroundings. Device 200 uses the information gathered by its sensors to accordingly adjust its settings.

In some embodiments, the configuration or adjustment of the device settings is performed in a "cloud", that is, by external sources connected to the device via, for example, the internet. For instance, in some embodiments, the device communicates with a remote server, and the remote server performs some or all of the configuration or adjustment tasks.

Figure 3:
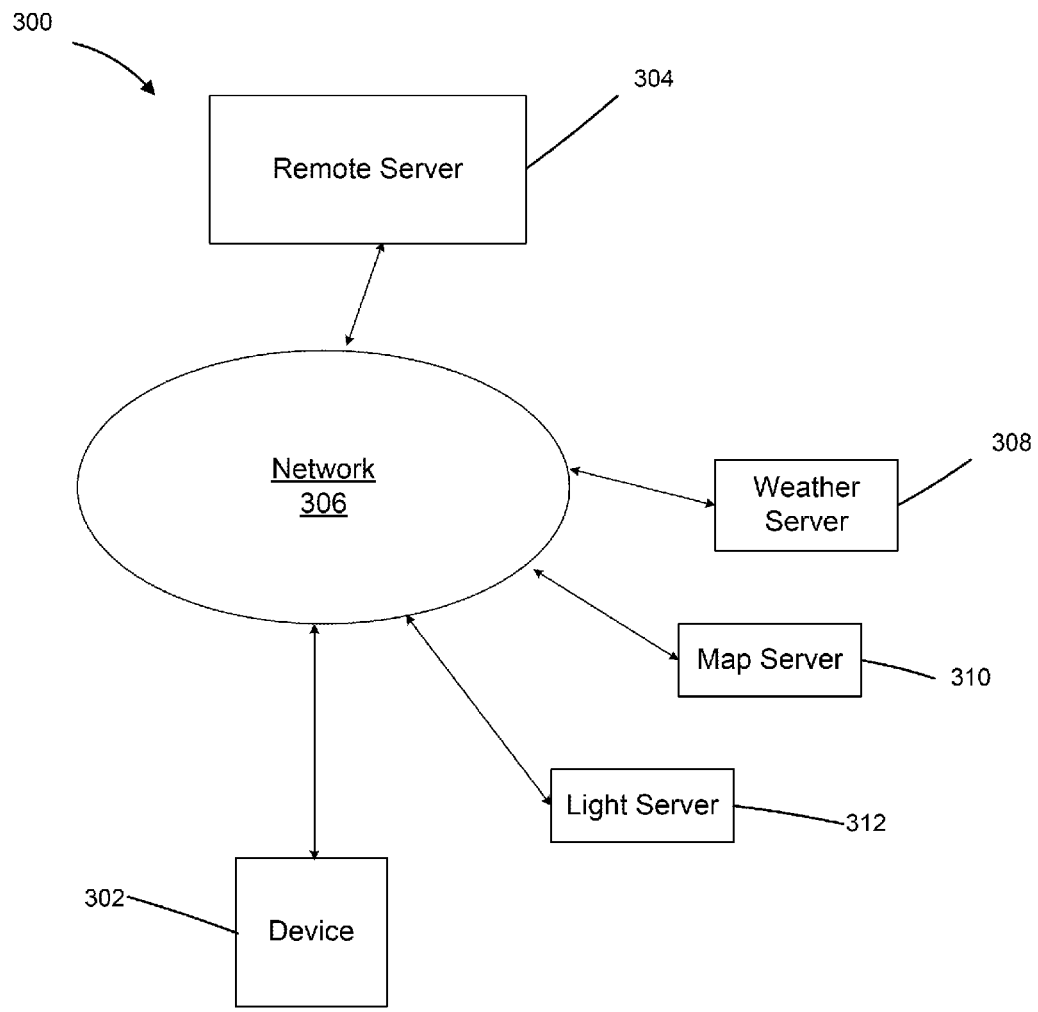
FIG. 3 is a block diagram of an exemplary system in accordance with various embodiments.

FIG. 3 is a block diagram of a system 300 in accordance with one such embodiment. System 300 includes a device 302 and a remote server 304. Moreover, system 300 includes various remote sensor servers which obtain information about the surroundings of device 302. Remote sensor servers may include, e.g., weather server 308, map server 310, and light server 312. Further, system 300 includes a network 306 through which various parts of system 300 communicate. For example, in FIG. 3, network 306 is used for communication among device 302, remote server 304, and various remote sensor servers 308, 310, and 312.

In some embodiments, device 302 is similar to devices 100 or 200 explained earlier. In some embodiments, device 302 may receive the environmental information from various local sensors (e.g., a camera, a light sensor, or a microphone), or from various external sources (e.g., a GPS system, or an information broadcaster that sends the information via a network communication tower or via the device's network adapters).

In some embodiments, remote server 304 is a server that receives information from device 302 and determines the settings for device 302. In some embodiments, remote server 304 receives or determines environmental information about the surroundings of device 302 based on information received from device 302 or from other sources, such as one or more of remote sensor servers 308, 310, and 312. In some embodiments, remote server 304 uses the environmental information for determining the desired settings for device 302. In some embodiments, remote server 304 sends the desired settings to device 302 for adjusting its settings. Alternatively, in some embodiments, remote server 304 directly interacts with device controls on device 302 and adjusts its settings according to the desired settings. For example, in some embodiments, remote server 304 can directly interact with controls for display or for sound of device 302 to adjust the display lighting, color, or volume of device 302.

In various embodiments, remote server 304 includes a central computer, a network controller, or a device adjustment software module executed by a computer that is external to device 302. Further, in various embodiments, network 306 includes wireless, wire/cable, or fiber optic networks. In various embodiments, various software or hardware used for adjusting the settings of device 302 are installed on remote server 304. Such remote installments, for example, reduce the demand on the storage or processor resources of device 302.

Figure 4:
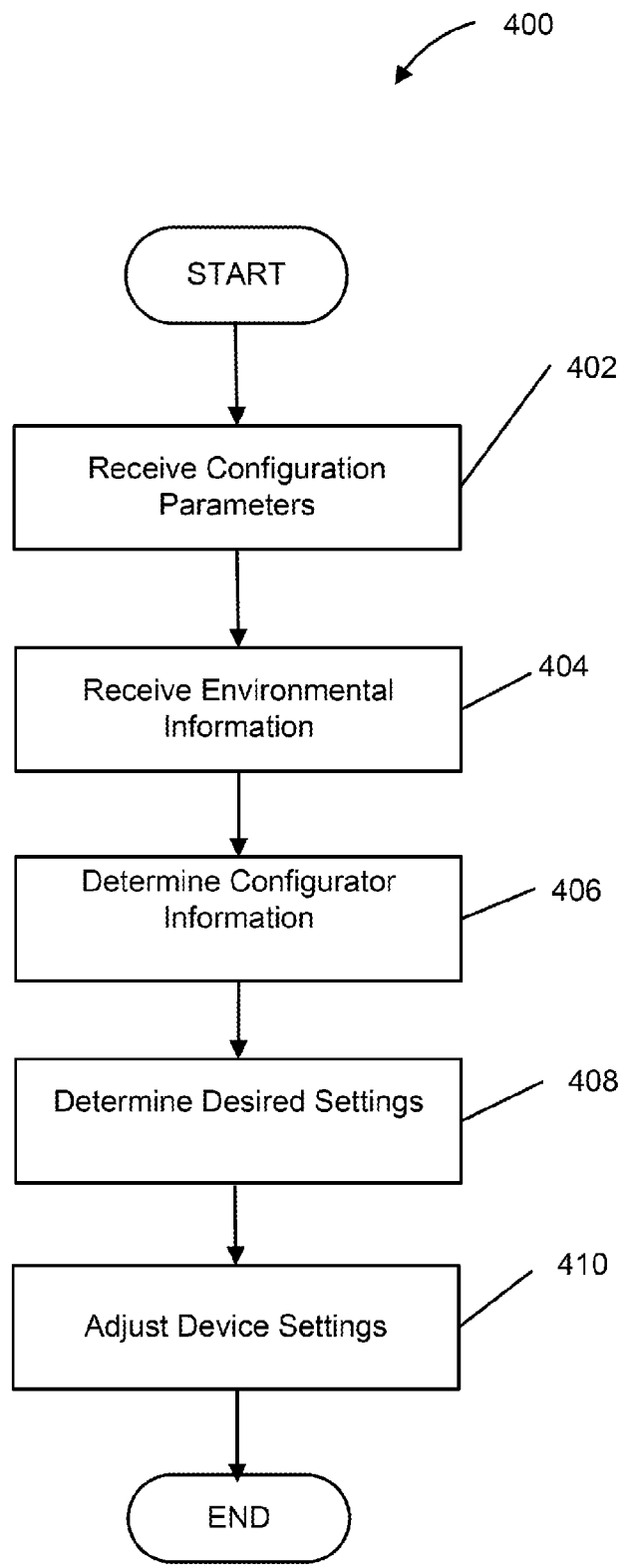
FIG. 4 illustrates an exemplary adjustment method in accordance with various embodiments.

FIG. 4 illustrates an environmental adjustment method 400 that may be performed by, for example, device 100 or 200, or system 300, in accordance with various embodiments.

In block 402, configuration parameters are received and stored. Configuration parameters can include parameters which determine a relation between the environmental information and the device settings. In some embodiments, for example, configuration parameters indicate that the keyboard back light must be turned on if the light intensity of the surroundings reaches below some threshold, or that the headphone volume must be increased if the external noise exceeds a specific level, but that the volume should not exceed a maximum volume level consistent with some safety or health standards.

In various embodiments, configuration parameters are stored locally on the device after being entered by a user and received via an input interface. In some embodiments, default configuration parameters may be pre-stored and received from memory. Configuration parameters may also be, for example, stored on a remote server after being entered by a user into the remote server, or received from another server. In some embodiments, the configuration parameters stored on the remote sever may be shared by multiple devices interacting with the remote server. In some embodiments, multiple configuration parameters may be stored on a remote server, each corresponding to one or more of multiple devices interacting with the remote server. In some embodiments, a user utilizing a device connects to a remote server and enters configuration parameters for the device.

In block 404, environmental information is received. In various embodiments, environmental information includes information related to the light, e.g., color combination or intensity of the surrounding light; related to the sound, e.g., volume of the surrounding sounds; temperature; or humidity of the surroundings of the device.

In various embodiments, environmental information may be received by the device from a network that is external to a device or from a sensor that is part of the device. The device may receive the environmental information from various local sensors of the device (e.g., a GPS receiver, a light sensor, or a microphone), or from various sources that are external to the device (e.g., a weather server, a map server, or a light server). In some other embodiments environmental information related to the surroundings of the device are received by a remote server. The remote server uses information received from local sensors and the information received from external sources to determine the conditions of the surroundings of the device. For example, in various embodiments, information received from the local light sensor or microphone determine the lighting or noise situation in that surroundings of the device. Also, information received from a GPS receiver of the device can be used to determine the location of the device.

On the other hand, in some embodiments, the remote server may send to external sources information about the location of the device and in response receives information about the environment of the device. For example, in some embodiments, the remote server sends the location information to a weather server or a light server and in response receives information about the weather conditions or outdoor lighting conditions at the location of the device. Similarly, in some embodiments, the remote server sends the location of the device to the map server and in response receives information about the type of business located at that location, e.g., a restaurant, a beauty parlor, a fitness club, or a library. In some embodiments, from this business information, the remote server deduces the environmental information related to the surroundings of the device. For example, if the remote server determines that the device is located in a library, it may deduce that the surroundings of the device is quiet and well lit. Alternatively, if the remote server determines that the device is located in a restaurant, it may deduce that the surroundings of the device are not as quiet or well lit as a library.

In block 406, the configurator information for the device is determined based on the environmental information. For example, in some embodiments, the configurator information includes all of environmental information. In some other embodiments, the configurator information may be a subset of the environmental information or a reformatted version of the environmental information, which is usable by the configurator.

In block 408, the desired settings for the device are determined based on the configurator information. In various embodiments, the desired settings may include various display characteristics, e.g., contrast, brightness, sharpness, or various audio characteristics, e.g., volume level of a speaker or a microphone, type of a ring tone, or various device appearance characteristics, e.g., device housing color, or device logo color. In various embodiments, the desired settings are determined based on the configurator information to provide an pleasant user experience. For example, if the configurator information indicates a quiet environment, the desired settings may include a soft ring tone, while if the configuration information indicates a noisy environment, the desired settings may include a loud ring tone.

In block 410, the settings of the device are adjusted based on the desired settings. In various embodiments, to adjust the settings, a component such as an adjuster may interact with various controls of the device, e.g., the display controls, sound controls, or recording controls.

In some embodiments, method 400 is performed locally by the device, that is, the device determines and adjusts its settings using hardware or software modules located on the device. In yet some other embodiments, method 400 is performed remotely, e.g., by a remote server, or through a cooperation between a remote server and the device. In some embodiments, the configuration or adjustment of the device settings is performed in a "cloud", that is, by external sources connected to the device via, for example, the internet. For instance, in some embodiments, the device communicates with a remote server, and the remote server performs some or all of the configuration or adjustment tasks.

Upon execution of method 400, the environmental information is analyzed and the device settings are accordingly adjusted. For example, in some embodiments, the device analyzes information received about the lighting or the temperature in the surroundings and accordingly adjusts the display's color, color temperature, sharpness, or luminosity. In some embodiments, the device adjusts the appearance of the device, including the luminosity of the keyboard, the color or the brightness of the housing or some part of the housing, or of a logo displayed on the housing, or that of some other section of the device. In some embodiments, the housing is made of a translucent material. Moreover, the device includes internal lightings of various colors comprising, e.g., of light emitting diodes (LEDs). Using the translucent housing and the internal LEDs enables the device to change the color of the housing or a part of the housing. In some embodiments, the device adjusts some physical characteristics of the housing, e.g., its temperature or its texture. For example, if the environmental temperature is low, in some embodiments the device warms up the housing to the extent that is feasible. For example, a device may warm up the housing by turning on some or all of its internal LEDs.

In some embodiments, a remote server connects to the device at various times, and upon each connection performs method 400 or some of the blocks in method 400. In these embodiments, new settings are pushed by the remote server to the device upon each connection. The device maintains its settings after each connection and until the next connection with the remote server, at which time its settings may change based on new desired settings determined by the remote server. Alternatively, in some other embodiments, the device initiates connection with the remote server and requests adjustment of its settings. In these embodiments, thus, the new settings are pulled by the device. In various embodiments, the device connects to the remote server at regular intervals, or at times determined by the operation or configuration of the system.

Figure 5:
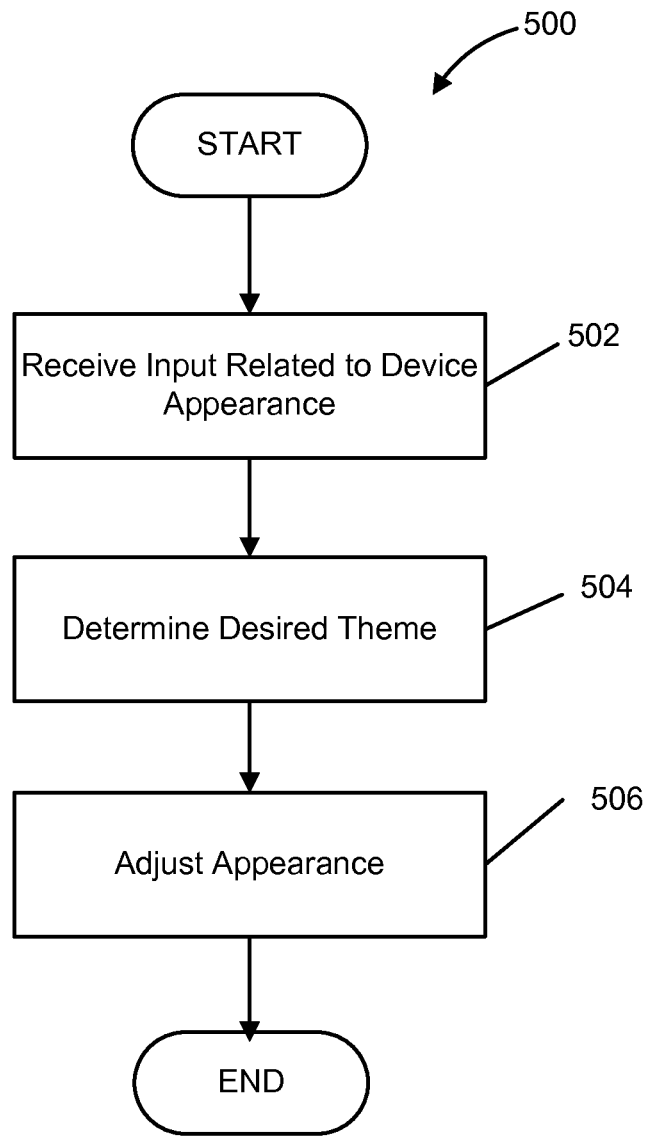
FIG. 5 illustrates an exemplary method for adjusting a device appearance based on an input from a user in accordance with various embodiments.

In some embodiments, the device also adjusts its appearance based on an input from the user of the device. FIG. 5 illustrates an exemplary method 500 performed by a device or by a remote server for adjusting the appearance of the device based on an input from a user and in accordance with at least one embodiment.

In block 502, an input is received related to the appearance of the device. For example, according to some embodiments, in block 502 a user selects a background for the device display. The selected background can be a pre-set background theme, or an image saved on the device by the user. In some other embodiments, the user selects a preferred background theme for the display.

In block 504, a desired appearance is determined for the device based on the input. In some embodiments, the desired appearance includes a desired foreground theme comprising a color or lighting setting for the foreground objects on the display to create a desired contrast with the background. Alternatively, in some embodiments, the desired theme for foreground objects on the display are selected for creating a desired aesthetic relationship with the colors and lighting of the background. In some embodiments, the desired theme is a global theme applied to all foreground objects on the display. In some other embodiments, the desired theme changes for different foreground objects, based on the local lighting or the local color of the background at the location of each object.

In block 506, the appearance of the device is adjusted in accordance with the desired theme. For example, in some embodiments, the colors or the lightings of the desired theme are applied to the foreground objects displayed on its display. Moreover, in some embodiments, exterior appearance of the device is changed in accordance with the desired theme. For example, in some embodiments, if the background includes a lot of green colors, the color of the housing is changed to green.

Figure 6:
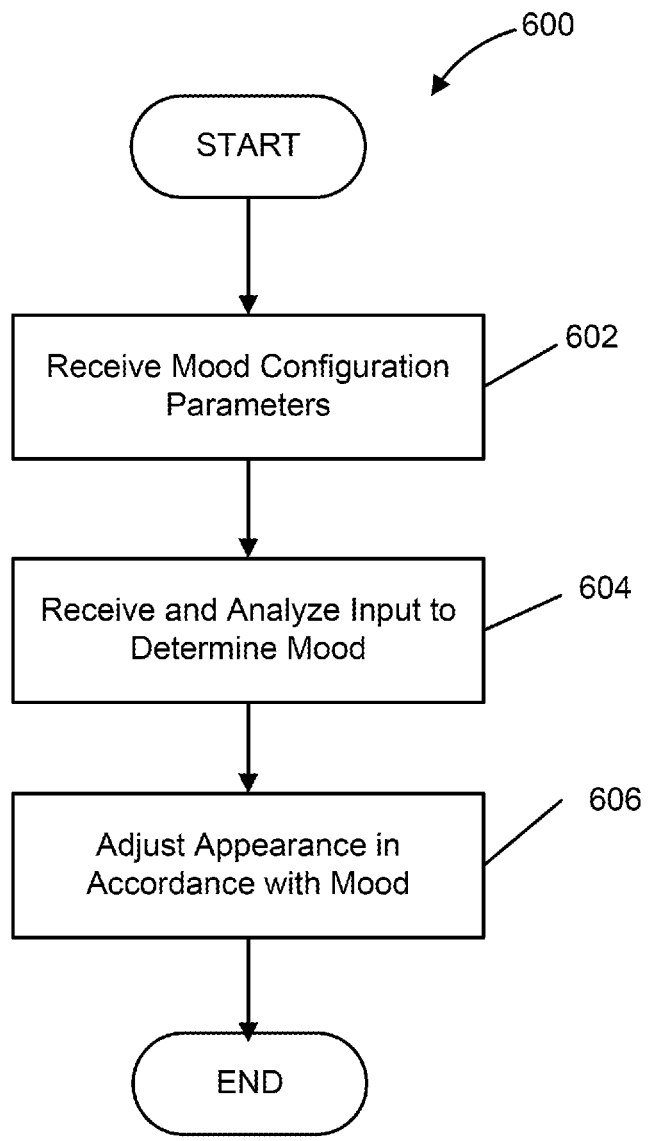
FIG. 6 illustrates an exemplary method for adjusting a device appearance based on the mood of a user in accordance with various embodiments.

In some embodiments, the appearance of the device is also adjusted based on the mood of the user. FIG. 6 illustrates an exemplary method 600 performed by a device or by a remote server for adjusting the appearance of the device based on the mood of a user and in accordance with an embodiment.

In block 602, mood configuration parameters are received and stored. In some embodiments, mood configuration parameters map various colors or various sounds to various moods of the user. Further, in some embodiments, mood configuration parameters are pre-set and in some other embodiments, those parameters are set by the user of the device. For example, in some embodiments, mood configuration parameters map an angry mood to the color red, a happy mood to the color green, and a sad mood to the color blue. Alternatively, in some embodiments, mood configuration parameters map various moods of the user to various pieces of music or various ring tones.

In block 604, some inputs are received and analyzed to determine the mood of the user. In various embodiments, the input is a text typed by the user, words spoken by the user, or a piece of music listened to by the user. The text, for example, can be part of an email or a text message typed by the user for a recipient. Analyzing the text may determine the mood of the user to be, for instance, angry, happy, or sad. For example, if the user enters words, acronyms (e.g., "LOL") or emoticons (e.g., ":-)") which indicate happiness, or if the user laughs or has a joyful tone, it may be deduced that the user is in a happy mood. In some embodiments, the device offers options to the user to directly enter her or his mood, e.g., in the form of different radio buttons for different moods displayed on the display. The user can thus directly enter her or his mood by selecting one of the buttons. In some other embodiments, the mood of the user is determined from other information, e.g., the location of the device. For example, if based on the information from a GPS and a map server, the device is determined to be located in a bar, the mood of the user may be determined to be a happy mood.

If, in block 604, a mood is successfully assigned to the user, in block 606 the appearance of the device is adjusted in accordance with the assigned mood. For example, in some embodiments, the color of the background or the color of the theme of a foreground object is adjusted to the color that is mapped to the determined mood. That is, in some embodiments, if a happy mood is assigned to the user, the color of the theme or the background on the display is changed to green, which is mapped to a happy mood. Alternatively, the color of the housing or the logo on the device may be changed in accordance with the assigned mood.

Methods 400, 500, or 600, or various blocks in each method can be performed by a device, hardware or a software module that is part of the device, by a remote server, or by a hardware or software module that is part of a remote server. In some embodiments, some of the tasks are performed by the device locally, and some other tasks are performed by one or more remote servers. Moreover, in some embodiments, one or more of methods 400, 500, or 600 are stored in a non-transitory computer readable medium, e.g., a CD-ROM, a computer storage device, or a flash memory, to be uploaded and performed by the device or by the remote server.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. An electronic device comprising:
   one or more sensors for receiving a stimulus from surroundings of the electronic device;
   a receiver for receiving environmental information related to the surroundings of the device from the one or more sensors and from a network, wherein the environmental information comprises a value of the stimulus from the surroundings and information regarding the surroundings from the network, wherein the receiver also receives mood information corresponding to a detected mood of a user while using the electronic device;
   a setting configurator for determining a desired setting for the device in view of configuration parameters based on information extracted by the receiver from the environmental information and the mood information, wherein the receiver only extracts information relating to settings that are adjustable on the device; and
   a setting adjuster for adjusting a device setting in accordance with the desired setting,
   wherein configuration parameters determine a relationship between the environmental information and the device setting, indicating at least rules for adjusting the desired setting according to user preference, and a permitted range of values for the desired setting.

2. The electronic device of claim 1 further comprising a transmitter for transmitting, to a remote server, location information related to a location of the device, wherein the location information comprises at least a type of business at the location and environmental information is determined according to the location information.

3. The electronic device of claim 1, wherein the sensor is a camera, a microphone, a heat sensor, a humidity sensor, a light sensor, or a motion detector.

4. The electronic device of claim 1, wherein the device setting includes a volume of a speaker, a volume of a headphone, a theme of a background displayed by a display, a color of the background displayed by the display, a brightness of the display, a sharpness of the display, a user interface displayed on the display, an intensity of a backlight of the display, or a contrast of the display.

5. The electronic device of claim 1, wherein the device includes a part, and wherein the device setting includes a color of the part, a luminosity of the part, a temperature of the part, or a texture of the part.

6. The electronic device of claim 5, wherein the part is a housing of the device, a section of the housing of the device, an input unit of the device, or a logo displayed on the device.

7. The electronic device of claim 1, wherein the receiver is further configured for receiving input information related to an input of a user of the device and wherein the setting configurator is for determining the desired setting as a function of the environmental information and the input information.

8. The electronic device of claim 7, wherein the input information includes a selection of an image by the user, a typing of a text by the user, or a selection of a mood by the user.

9. The electronic device of claim 1, wherein the electronic device further includes a portable computer, a desktop computer, a handheld device, a smart camera, a smart phone, or a remote control device.

10. A method performed by an electronic device for adjusting an appearance of the electronic device, the method comprising:
    receiving, one or more sensors associated with the electronic device, a stimulus from a surroundings of the electronic device;
    receiving, by the receiver, environmental information related to the surroundings of the device, wherein the environmental information comprises a value of the stimulus from the surroundings and information regarding the surroundings from a network, wherein the receiver also receives mood information corresponding to a detected mood of a user using the electronic device;
    determining, by a setting configurator, a desired setting for the device as a function of configuration parameters based on information extracted from the environmental information and the mood information, wherein only information relating to settings that are adjustable on the device are extracted; and
    adjusting, by a setting adjuster, a device setting in accordance with the desired setting,
    wherein configuration parameters determine a relationship between the environmental information and the device setting, indicating at least rules for adjusting the desired setting according to user preference, and a permitted range of values for the desired setting.

11. The method of claim 10 further comprising transmitting to a remote server, via a transmitter, location information related to a location of the device, wherein the location information comprises at least a type of business at the location and environmental information is determined according to the location information.

12. The method of claim 10, wherein the stimulus includes light, sound, luminosity, color, temperature, humidity, or gravity.

13. The method of claim 10, wherein the device setting includes a volume of a speaker, a volume of a headphone, a theme of a background displayed by a display, a color of the background displayed by the display, a brightness of the display, a sharpness of the display, a user interface displayed on the display, an intensity of a backlight of the display, or a contrast of the display.

14. The method of claim 10, wherein the device includes a part, and wherein the device setting includes a color of the part, a luminosity of the part, or a texture of the part.

15. The method of claim 14, wherein the part is a housing of the device, a section of the housing of the device, an input unit of the device, or a logo displayed on the device.

16. The method of claim 10 further comprising receiving input information related to an input of a user of the device and wherein the determining includes determining the desired setting as a function of the environmental information and the input information.

17. The method of claim 16, wherein the input information includes a selection of an image by the user, a typing of a text by the user, or a selection of a mood by the user.

18. A non-transitory computer-readable medium having computer-readable code executable by the electronic device to perform the method of claim 10.

* * * * *